United States Patent
Seo et al.

(10) Patent No.: US 6,916,005 B2
(45) Date of Patent: Jul. 12, 2005

(54) DISPLACEMENT SENSOR AND SOLENOID VALVE DRIVER

(75) Inventors: Kazutaka Seo, Tokyo (JP); Masao Morita, Tokyo (JP); Toshie Takeuchi, Tokyo (JP); Yoshiaki Yamazaki, Tokyo (JP); Toshiyuki Yoshizawa, Tokyo (JP); Masafumi Sugawara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 123 days.

(21) Appl. No.: 10/398,697

(22) PCT Filed: Aug. 31, 2001

(86) PCT No.: PCT/JP01/07569

§ 371 (c)(1),
(2), (4) Date: Apr. 8, 2003

(87) PCT Pub. No.: WO03/021183

PCT Pub. Date: Mar. 13, 2003

(65) Prior Publication Data

US 2004/0011979 A1 Jan. 22, 2004

(51) Int. Cl.$^7$ .............................................. F16K 31/02
(52) U.S. Cl. ................... 251/129.15; 335/301
(58) Field of Search ...................... 251/129.15, 129.01; 335/301

(56) References Cited

U.S. PATENT DOCUMENTS

| 3,484,678 | A | | 12/1969 | Church |
| 4,304,391 | A | * | 12/1981 | Yamaguchi ............ 251/129.17 |
| 4,737,698 | A | | 4/1988 | McMullin et al. |
| 5,159,949 | A | * | 11/1992 | Prescott et al. ........ 251/129.04 |
| 5,897,098 | A | * | 4/1999 | Nishinosono et al. .. 251/129.08 |
| 6,182,942 | B1 | * | 2/2001 | Kadlicko ................ 251/129.15 |
| 6,321,700 | B1 | | 11/2001 | Hein et al. |
| 6,469,500 | B1 | * | 10/2002 | Schmitz et al. ........ 251/129.16 |

FOREIGN PATENT DOCUMENTS

| DE | 19913050 A1 | * | 9/2000 |
| JP | 57-001210 | | 1/1982 |
| JP | 57-179104 U | | 11/1982 |
| JP | 04-024510 | | 1/1992 |
| JP | 04-265802 | | 9/1992 |
| JP | 05-264203 | | 10/1993 |
| JP | 09-177521 | | 7/1997 |
| JP | 3057075 U | | 12/1998 |
| JP | 2000-161985 | | 6/2000 |
| JP | 2001-174205 | | 6/2001 |

* cited by examiner

Primary Examiner—John Bastianelli
(74) Attorney, Agent, or Firm—Leydig, Voit & Mayer, Ltd.

(57) ABSTRACT

A displacement sensor includes a ferromagnetic member for forming a magnetic path, a coil for generating a magnetic field in the magnetic path when fed with a high-frequency current, and a low-resistance magnetic-shielding member that moves across magnetic flux passing through the magnetic path. The sensor is excellent in production is, robust, and useful in high speed operation.

10 Claims, 13 Drawing Sheets

DISPLACEMENT SENSOR AND SOLENOID VALVE DRIVER

TECHNICAL FIELD

The present invention relates to a displacement sensor that measures a movement position of a moving body, and more particularly to an electromagnetic valve driving device that drives an intake valve or an exhaust valve of an internal combustion engine, for instance, to a predetermined position sensed by the displacement sensor.

BACKGROUND ART

FIG. 1 is a principle explanatory drawing showing one example of conventional displacement sensors.

Referring to FIG. 1, reference numeral 101 denotes a magnetic material (a high-electric resistance magnetic material) forming a magnetic path, 102 denotes a space formed within the magnetic material so as to cross the magnetic path, 103 denotes a permanent magnet movably provided in the space, and 104 denotes a Hall device, provided in the magnetic path, for detecting a change of the magnetic flux Φ.

This structure brings on a change of the distribution of the magnetic flux in the magnetic path accompanied with a movement of the permanent magnet 103 in the direction shown by an arrow, and detects the change by the Hall device 104 in order to detect a position of the permanent magnet 103, i.e., a position of the moving body.

FIG. 2 is a principle explanatory drawing showing another example of conventional displacement sensors.

Referring to FIG. 2, reference numeral 111 denotes an E-section magnetic material forming a magnetic path, 112 denotes a coil provided around the base of the central magnetic material fragment of the E-section magnetic material 111, and 113 denotes a non-magnetic single turn coil movably provided around the top of the central magnetic material fragment.

When a high frequency current is fed to the coil 112, this structure generates an oscillating magnetic field, and an induced current in the single turn coil 113 on the basis of the magnetic flux Φ passing through the magnetic path. But it generates no magnetic flux at the top of the central magnetic material fragment above the single turn coil 113. Intercepting the magnetic field of the magnetic circuit by the induced current flowing in the single turn coil 113 means that an inductance of the magnetic circuit becomes much small. The observation of such a change of the inductance enables detection of the position of the single turn coil that is a movable part.

FIG. 3 is a principle explanatory drawing showing another example of conventional displacement sensors.

Referring to FIG. 3, reference numeral 121 denotes a cylindrical coil wound cylindrically, 122a, 122b denote pickup coils provided within both ends of the cylindrical coil 121, 123 denotes a moving element that is made of a low-electric resistance material, and moves on a shaft of the cylindrical coil 121.

While feeding a high frequency current through the cylindrical coil 121 to generate a magnetic field, on moving the moving element 123, this structure detects by the pickup coils 122a and 122b the distribution of alternating magnetic field changed depending on where the moving element 123 presently is.

The conventional displacement sensors thus arranged as shown in FIG. 1 is reluctant to a high-speed drive to move the permanent magnet, and makes it impossible to build robustly. The displacement sensor shown in FIG. 2 lacks robustness on account of an operation of the single turn coil. Since the displacement sensor shown in FIG. 3 has an air-core cylindrical coil, it cannot expect a heavy output unless a heavy current is fed to the coil. Moreover, it is difficult to design the magnetic field for attaining the linear relationship between displacement and an output signal.

DISCLOSURE OF INVENTION

The present invention has been made to solve the above-mentioned problems. An object of the present invention is to provide a displacement sensor that is robust and does not need to be axis symmetry, and is to provide an electromagnetic valve driving device that includes the displacement sensor, and is able to perform with high precision a closing and opening operation of an intake valve or an exhaust valve for the internal combustion engine.

The displacement sensor according to the present invention includes a ferromagnetic member for forming a magnetic path; a coil for generating a magnetic field within the magnetic path when feeding a high frequency current to the coil; and a low-resistance magnetic-shielding member movably provided across magnetic flux passing through the magnetic path.

According to the present invention, it permits formation of the magnetic path not concentric but in E shape, for instance, which easily manufactures the displacement sensor and improves robustness.

The displacement sensor according to the present invention, further includes two or more ferromagnetic members forming a magnetic path; and a low-resistance magnetic-shielding member that interlinks with a path of the magnetic path formed by each of the ferromagnetic members.

According to the present invention, it becomes possible to dispose the ferromagnetic member forming the magnetic path after the low-resistance magnetic-shielding member is secured, which is a moving element, thereby allowing easy manufacture of the displacement sensor and disposition of it in a small space.

In the displacement sensor according to the present invention, a coil is provided on the internal surface of a fixed-side magnetic-path forming member; and a movable-side magnetic-path forming member opposing the fixed-side magnetic-path forming member is provided on a shaft that moves in an axial direction.

According to the present invention, it facilitates fitting of the displacement sensor on the object whose position is to be detected.

In the displacement sensor according to the present invention, a low-resistance magnetic-shielding member is provided on the end face of either one or each of the fixed-side magnetic-path forming member and the movable-side magnetic-path forming member.

According to the present invention, it generates no leakage flux on the ends of a cylindrical fixed-side magnetic-path forming member and the movable-side magnetic-path forming member, which guarantees linearity between the displacement of the movable-side magnetic-path forming member and the output, and improves the accuracy of the sensor.

In the displacement sensor according to the present invention, a pressure tool function part is provided at a fitting part of the low-resistance magnetic-shielding member.

According to the present invention, it firmly secures the low-resistance magnetic-shielding member.

An electromagnetic valve driving device according to the present invention includes a magnetic-path forming iron core; a movable iron core that is a constituent of the magnetic-path forming iron core; a coil generating a magnetic flux when energized; a movable iron-core connecting shaft, to an end of which the movable iron core is secured, for driving by electromagnetic force and spring force; and a valve shaft that abuts the end face of the movable iron-core connecting shaft by spring force; and a fixed-side magnetic-path forming member of a displacement sensor is provided on the magnetic-path forming iron core, and a movable-side magnetic-path forming member id secured on the movable iron-core connecting shaft piercing through a central hole of this fixed-side magnetic-path forming member.

According to the present invention, it provides the electromagnetic valve driving device that is capable of detecting the movement position of the movable iron-core connecting shaft with high precision.

In the electromagnetic valve driving device according to the present invention, a concavity is formed on the top surface of the magnetic-path forming iron core, and the fixed-side magnetic-path forming member of the displacement sensor is secured within the concavity.

According to the present invention, it miniaturizes the electromagnetic valve driving device that is capable of detecting the movement position of the movable iron-core connecting shaft with high precision.

The electromagnetic valve driving device according to the present invention, the fixed-side magnetic-path forming member of the displacement sensor is provided on the bottom surface of the magnetic-path forming iron core, and the movable-side magnetic-path forming member is secured on the movable iron-core connecting shaft piercing through the central hole of the fixed-side magnetic-path forming member.

According to the present invention, it miniaturizes the electromagnetic valve driving device that is capable of detecting the movement position of the movable iron-core connecting shaft with high precision.

The electromagnetic valve driving device according to the present invention, the fixed-side magnetic-path forming member of the displacement sensor is provided within the magnetic-path forming iron core, and the movable-side magnetic-path forming member moving within the fixed-side magnetic-path forming member is secured on the movable iron-core connecting shaft.

According to the present invention, it miniaturizes and gives the electromagnetic valve driving device a good appearance that is capable of detecting the movement position of the movable iron-core connecting shaft with high precision.

BEST MODE FOR CARRYING OUT THE INVENTION

Now, to describe the present invention in more detail, the best mode for carrying out the present invention will be described with reference to the accompanying drawings.

First Embodiment

Figure 1:
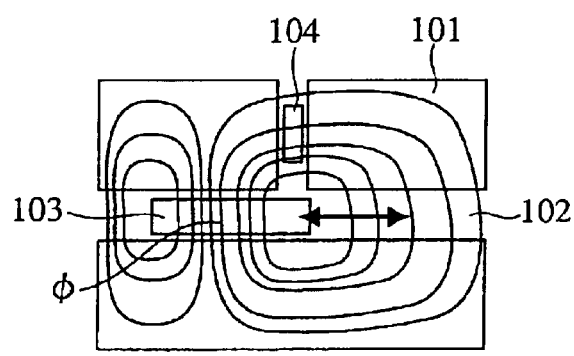
FIG. 1 is an explanatory drawing showing one example of a conventional displacement sensor.
Figure 2:
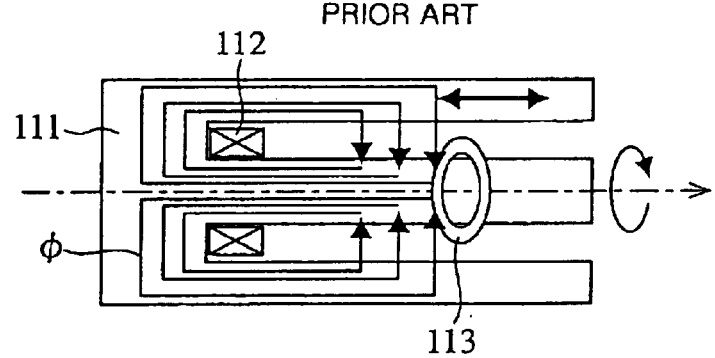
FIG. 2 is an explanatory drawing showing another example of a conventional displacement sensor.
Figure 3:
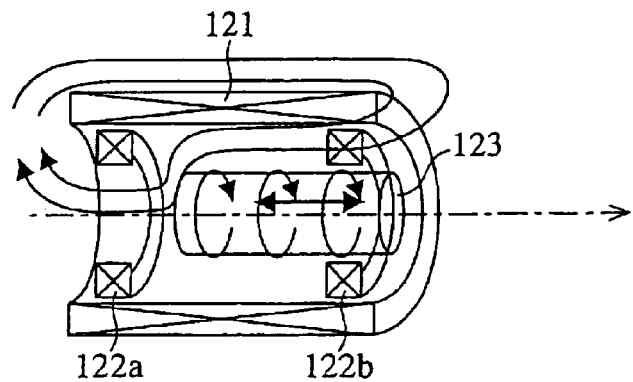
FIG. 3 is an explanatory drawing showing another conventional displacement sensor.
Figure 4:
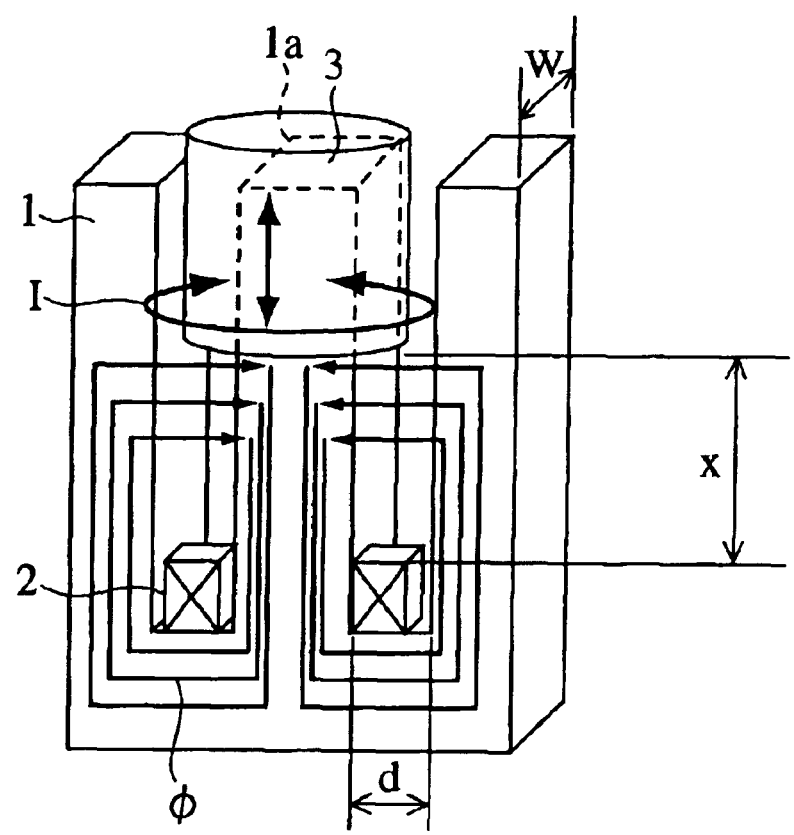
FIG. 4 is a perspective view showing one example of a displacement sensor according to a first embodiment.

FIG. 4 is a perspective diagram showing one example of the displacement sensors according to the first embodiment.

Referring to FIG. 4, reference numeral 1 denotes an E-shaped stator iron core, made of ferromagnetic material, for forming a magnetic path, 2 denotes a coil provided around the base of the central magnet fragment 1a of the E-shaped stator iron core 1, 3 denotes a moving body made of a non-magnetic material movably provided in the top end of the central magnet fragment 1a.

The operation of the displacement sensor of the first embodiment will next be described.

When feeding a high-frequency current to the coil 2, an oscillating magnetic field is generated, and an induced current is generated in the moving body 3 depending on the magnetic flux Φ passing through the magnetic path. But no magnetic flux is generated on the top of the E-shaped stator iron core 1, lying above the moving body 3. Because the magnetic field of the magnetic circuit is intercepted by induced current I flowing through this moving body 3, inductance of this magnetic circuit becomes small. The observation of this change of the inductance by observing means (not shown) enables detection of the movement position of the moving body 3.

Figure 5:
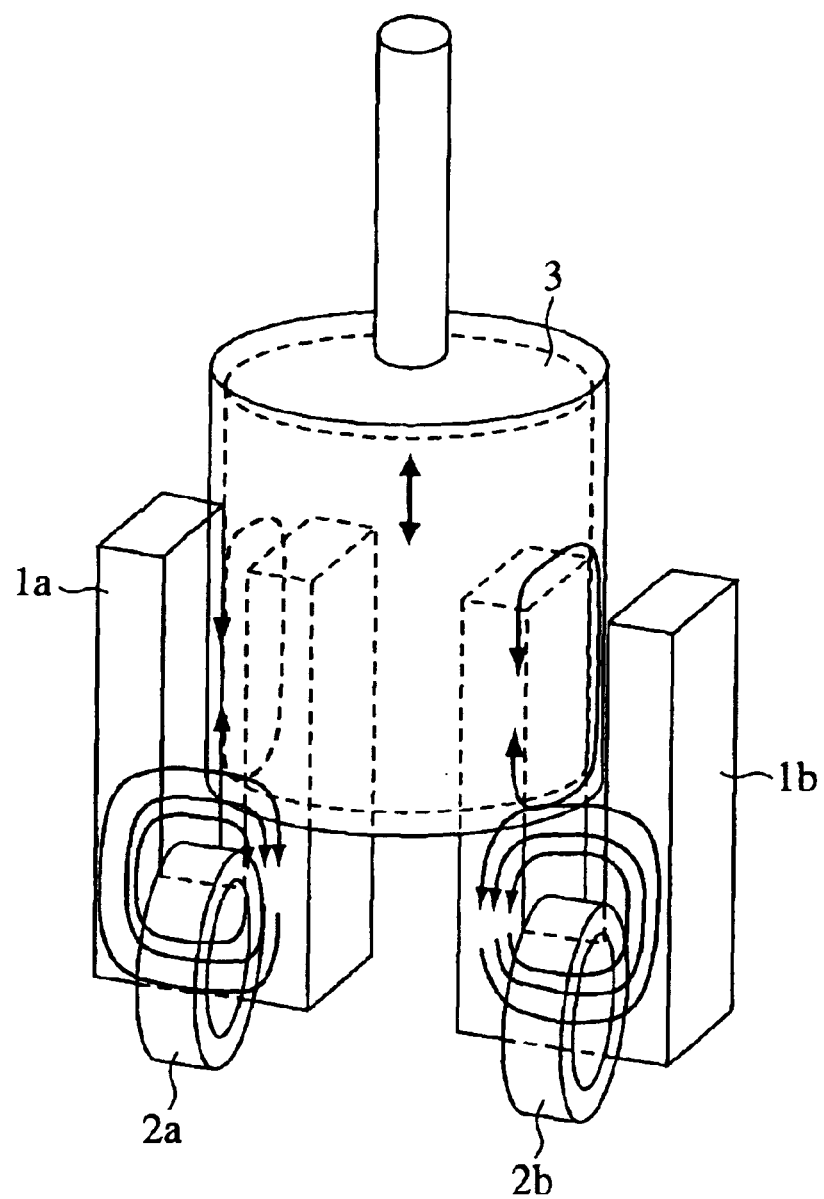
FIG. 5 is a perspective view showing a modification of the displacement sensor shown in FIG. 4.

FIG. 5 is a perspective view showing a modification of the displacement sensors according to the first embodiment. In FIG. 5, two horseshoe-shaped stator iron cores $1a$, $1b$ for forming a magnetic path are juxtaposed, coils $2a$, $2b$ are provided around the horseshoe-shaped stator iron cores $1a$, $1b$, respectively, and moving body 3 is put in such a manner as to bridge over the opposing sections of the horseshoe-shaped stator iron cores $1a$, $1b$. The coils $2a$, $2b$ are connected in series, and the movement position of the moving body 3 can be detected in the same manner as with FIG. 4 by feeding a high-frequency current to the coils $2a$, $2b$.

Hereupon, an explanation is given as to relationships among air gap width d, opposed length x between the moving element and the stator iron core, length W of the opposing sections of the stator iron core, and inductance L shown in FIG. 4. When a current I flows through the coil 2 of coil turns number N, the magnetic field H formed in the air gap width d is given by the following equation $$NI = \oint H dl = dH.$$

Where l is the peripheral length of the magnetic path. The magnetic field H increases in accordance with the air gap width d, the magnetic field is obtained by integrating as much as the air gap width d. Let calculate the inductance L of this magnetic circuit. The magnetic flux Φ interlinking with the coil is given by the following equation $$\Phi = IL = N \times d\mu H \times xW.$$

Accordingly, the inductance L of the magnetic circuit is given by the following equation $$L \propto N^2 \times xW.$$

It can be seen from the above equation that the inductance L is proportional to the opposed length x.

In this way, detecting the change of the opposed area xW between the moving body 3 and the stator 1 as that of the inductance of the magnetic circuit forms the foundation of the displacement sensor using an AC coil. The inductance is proportional to the opposed length x if there is no leakage flux.

As mentioned above, according to the first embodiment, it permits formation of the magnetic path not concentric but in E shape, for instance, which easily manufactures the displacement sensors, and improves robustness.

Second Embodiment

Figure 6:
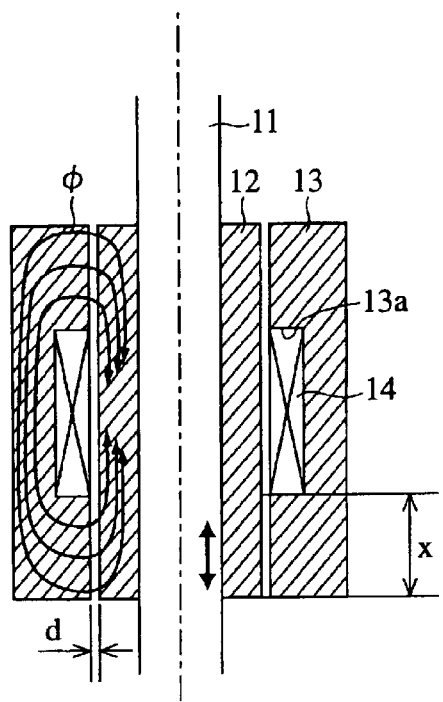
FIG. 6 is a longitudinal sectional view showing a displacement sensor according to a second embodiment.

FIG. 6 is a longitudinal sectional view showing the displacement sensor according to the second embodiment.

Referring to FIG. 6, reference numeral 11 denotes a shaft moving in an axial direction, 12 denotes a moving element made of ferromagnetic material and secured around the outside of the shaft 11, 13 denotes a stator iron core, having a length substantially equal to that of the moving element 12, for forming a magnetic path, and 14 denotes a coil provided within a concavity $13a$ formed on the surface of the stator iron core 13 opposing the moving element 12.

The operation of the displacement sensor of the second embodiment will now be described below.

Figure 7:
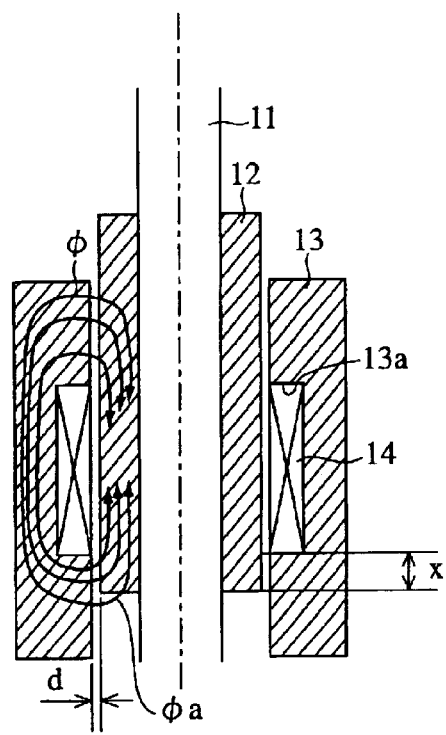
FIG. 7 is a longitudinal sectional view showing the displacement sensor according to a second embodiment, in which a moving body is moved.

When feeding a high-frequency current to the coil 14, the generated magnetic flux Φ flows through the moving element 12 and the stator iron core 13 as shown in FIG. 6. In this state, when, as shown in FIG. 7, the shaft 11 moves upward, the positional relationship between the moving element 12 and the stator iron core 13 is changed, bringing about a change in an area of the opposed magnetic path (depth W×height x) between the moving element 12 and the stator iron core 13 opposed each other at the air gap width d intervals, and the inductance is changed in proportion to this change. Therefore, the detection of the change of this induction makes it possible to do the movement position of the shaft 11, i.e., the moving element 12.

As mentioned above, according to the second embodiment, assuming the shaft 11 to be the shaft of an actuator allows easy fitting of a displacement sensor in the actuator.

Third Embodiment

Figure 8:
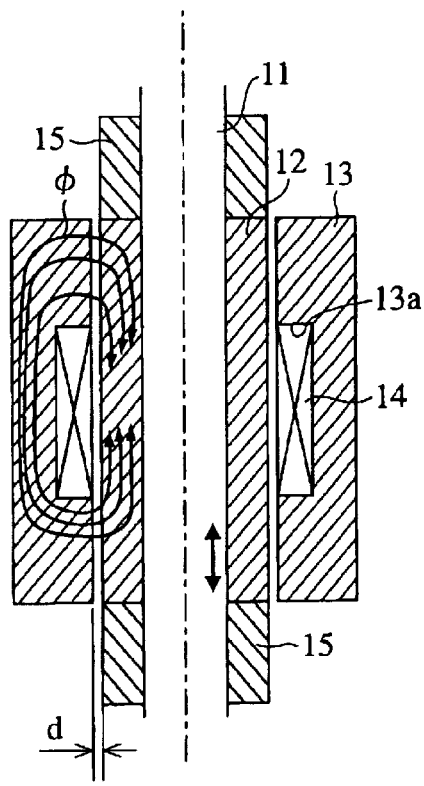
FIG. 8 is a longitudinal sectional view showing a displacement sensor according to a third embodiment.

FIG. 8 is a longitudinal sectional view showing the displacement sensor according to third embodiment.

Referring to FIG. 8, reference numeral 15 denotes a magnetic-shielding material provided on both end faces of the moving element 12 and made of low-resistance metal. As other components are the same as those of the second embodiment shown in FIGS. 6, 7, the same reference numerals as the second embodiment indicate the same components, and thus descriptions thereof are omitted for brevity's sake.

The operation of the displacement sensor of the third embodiment will now be described below.

Figure 9:
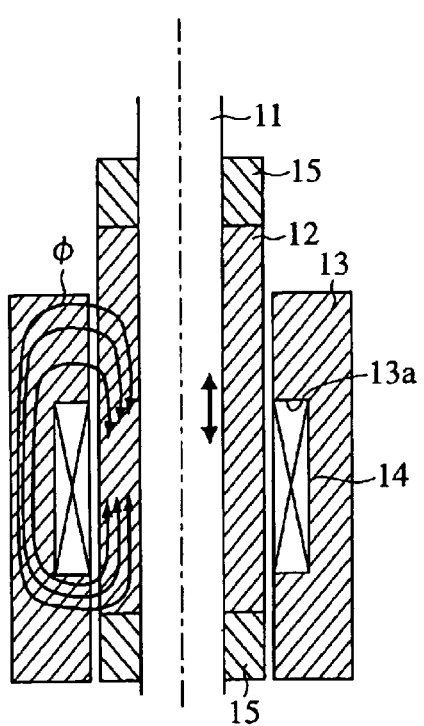
FIG. 9 is a longitudinal sectional view showing the displacement sensor according to a third embodiment, in which a moving body is moved.

When feeding a high-frequency current to the coil 14, the generated magnetic flux flows through the moving element 12 and the stator iron core 13 as shown in FIG. 8. In this state, when, as shown in FIG. 9, the shaft 11 moves upward, the positional relationship between the moving element 12 and the stator iron core 13 is changed. At this event, the second embodiment as shown in FIG. 6 leaks a part Φa of the magnetic flux Φ to the moving element 12 from the end face thereof through the space. On the contrary, the third embodiment does not leak magnetic flux Φa as shown in FIG. 9.

As mentioned above, according to the third embodiment, it eliminates leakage flux Φa from the end faces of the moving element, thereby enhancing linearity of the detected signal with respect to the movement displacement of the moving element 12.

Fourth Embodiment

Figure 10:
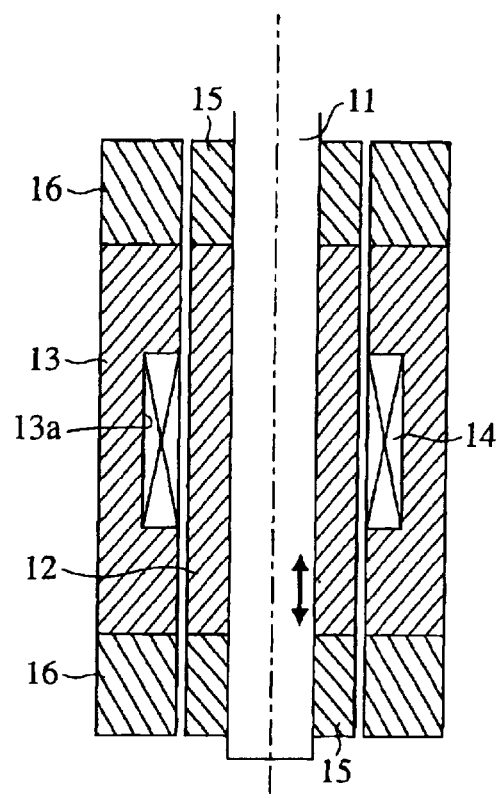
FIG. 10 is a longitudinal sectional view showing a displacement sensor according to a fourth embodiment

FIG. 10 is a longitudinal sectional view showing the displacement sensor according to the fourth embodiment. In FIG. 10, magnetic-shielding members 16 are provided on both end faces of the stator iron core 13, and other components are the same as those of the third embodiment shown in FIGS. 8, 9. Such a structure thus configured as above reduce the leakage flux with a higher degree of reliability, further improving linearity of the detected signal with respect to the movement displacement of the moving element 12.

Fifth Embodiment

Figure 11:
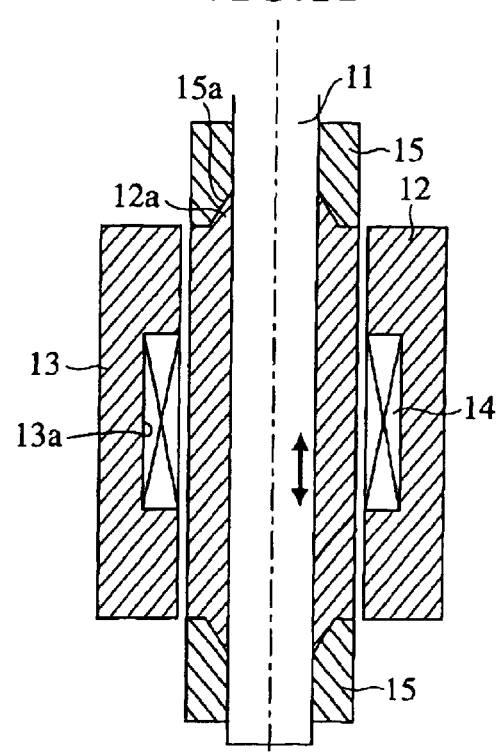
FIG. 11 is a longitudinal sectional view showing a displacement sensor according to a fifth embodiment.

FIG. 11 is a longitudinal sectional view showing the displacement sensor according to the fifth embodiment. In FIG. 10, the moving elements 12 have on the end faces thereof a convexity $12a$ and magnetic-shielding materials 15 have a concavity $15a$ engaging therewith. Other components are the same as those of the embodiments described above. Such a structure thus configured as above improves interlocking of the movable part 12 and the magnetic-shielding material 15 by the grace of a pressure tool function based on the fine concavo-convex engagement between the convexity 12a and the concavity 15a, and firmly secures the moving element 12 on the shaft 11 by the magnetic-shielding material 15.

Sixth Embodiment

Figure 12:
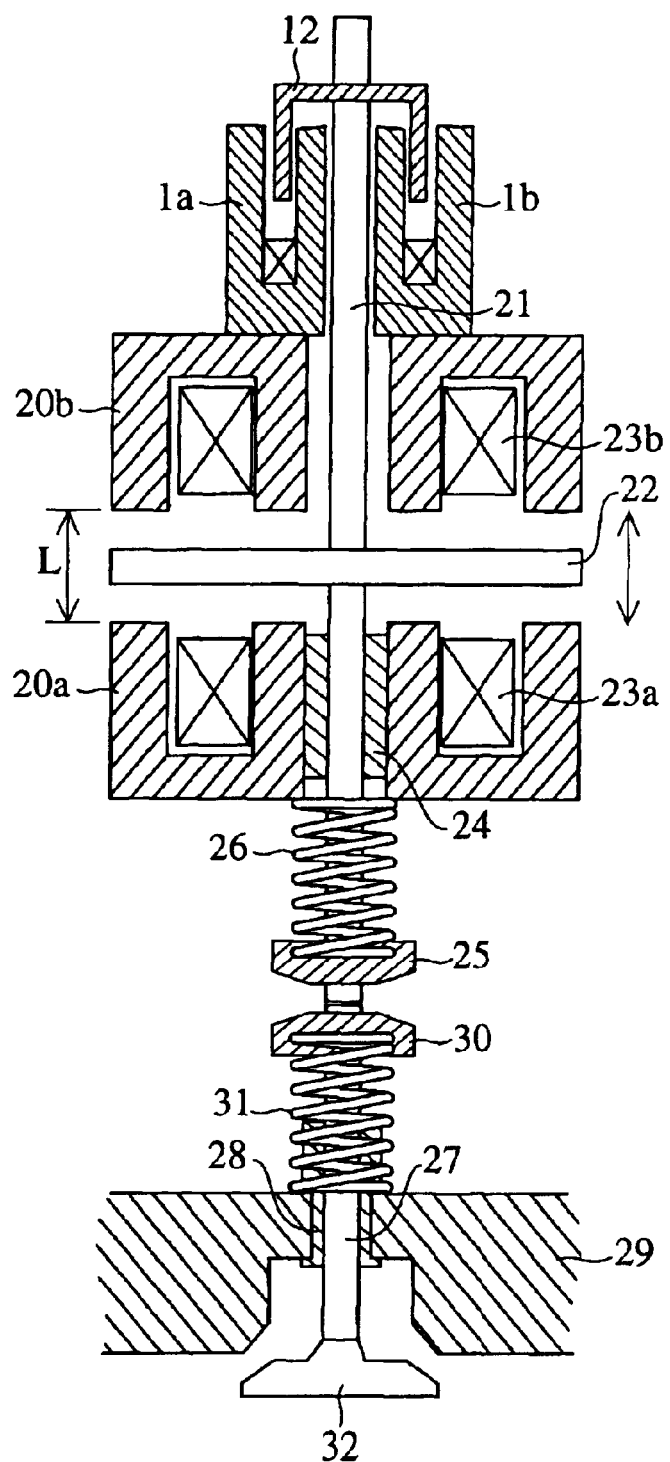
FIG. 12 is a longitudinal sectional view showing an electromagnetic valve driving device according to a sixth embodiment.

FIG. 12 is a longitudinal sectional view showing the electromagnetic valve driving device according to the sixth embodiment.

Referring to FIG. 12, reference numeral 21 denotes a movable iron-core connecting shaft, 20a, 20b denote horseshoe-shaped cross section stator iron cores, at the center of which the movable iron-core connecting shaft 21 is piercing through, and these stator iron cores 20a, 20b are disposed at a space L, with the end faces of their horseshoe-shaped openings facing each other. Reference numeral 22 denotes a moving element secured on the movable iron-core connecting shaft 21 within the space L, 23a, 23b denote coils wound around the stator iron cores 20a, 20b, respectively, 24 denotes a bearing of the movable iron-core connecting shaft 21, provided within the central hole of the stator iron core 20a, 25 denotes a spring bearing provided in the bottom end of the movable iron-core connecting shaft 21, 26 denotes a first coil spring fitted around the movable iron-core connecting shaft 21 and held between the bottom surface of the stator iron core 20a and the spring bearing 25, 27 denotes a valve shaft held movably in a vertical direction relative to the device body 29 through bearing 28 such that the top end of the valve shaft abuts against the bottom end of the movable iron-core connecting shaft 21, 30 denotes a spring bearing provided on the top end of the valve shaft 27, 31 denotes a second coil spring fitted around the valve shaft 27 and held between the spring bearing 30 and the device body 29, and 32 denotes a valve disposed on the bottom end of the valve shaft 27. The electromagnetic valve driving device is composed of the above-described elements.

In addition, stator iron cores 1a, 1b of the displacement sensor are juxtaposed in a axis symmetry manner on the top surface of the stator iron core 20b that is a constituent element of the above-mentioned electromagnetic valve driving device, and moving element 12 going in and out of the space of the stator iron cores 1a, 1b, is disposed on the top end of the movable iron-core connecting shaft 21 extended such that the shaft 21 pierces through these stator iron cores 1a, 1b. Alternatively, as stator iron cores 1a, 1b of the displacement sensor, a cylinder having a bottom plate, at the center of which a hole is piercing through, maybe integrally formed.

The operation of the displacement sensor of the sixth embodiment will now be described below.

When the first coil 23a and the second coil 23b are not energized, the movable iron core 22 is located at a predetermined position within the space L by the aide of balance of the spring forces of the first coil spring 26 and the second coil spring 31.

In this state, when energizing the first coil 23a to open the valve 32, the movable iron core 22 moves to the stator iron core 20a side by electromagnetic force generated by the magnetic field composed of the magnetic flux passing through the magnetic path formed by the stator iron core 20a and the moving element 22 and the spring force of the second coil spring 26, and thereby the movable iron-core connecting shaft 21 and the valve shaft 27 move downward against the first coil spring 26 to open the valve 32. At this time, to what extent the valve 32 opens is determined depending on how much an energizing current is supplied to the first coil 23a.

Subsequently, when energizing the second coil 23b the first coil 23a to close the valve 31, the movable iron core 22 moves to the stator iron core 20b side by electromagnetic force generated by the magnetic field composed of the magnetic flux passing through the magnetic path formed by the stator iron core 20b and the movable iron core 22 and the spring force of the second coil spring 31, and thereby the movable iron-core connecting shaft 21 and the valve shaft 26 move upward against the first coil spring 26 to close the valve 32.

As mentioned above, according to the fourth embodiment, in an opening and closing operation of the valve 32, the position of the moving element 12 is changed relative to the stator iron cores 1a, 1b of the displacement sensor. Accordingly, the position of the movable iron-core connecting shaft 21, i.e., the movement position of the valve shaft that moves following the movement of the movable iron-core connecting shaft 21 can be detected depending on a change of inductance in the magnetic circuit. Moreover, the robust displacement sensor according to the present invention makes it possible to easy fitting of the sensor in the electromagnetic valve driving device that operates at a high speed.

Seventh Embodiment

Figure 13:
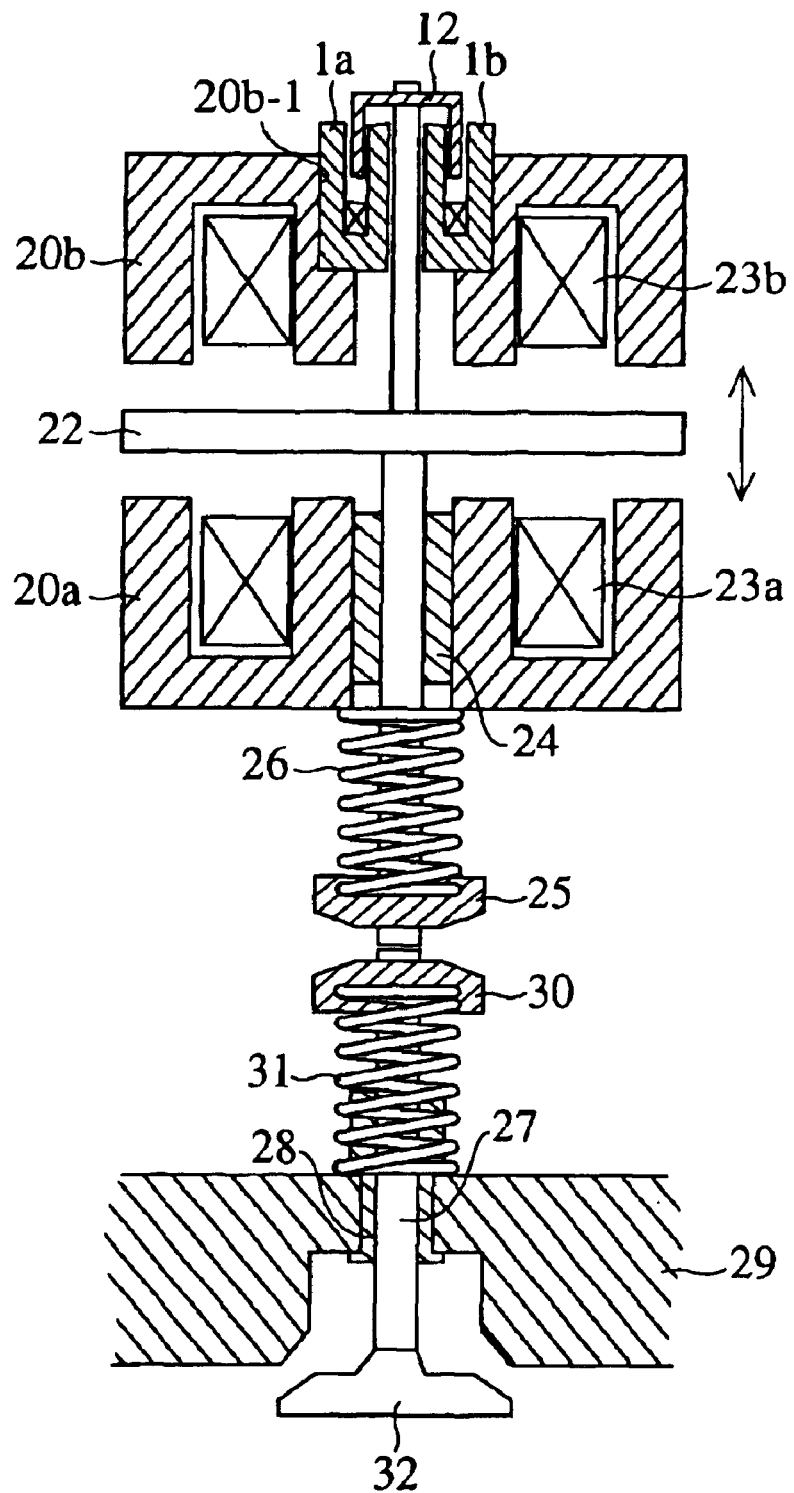
FIG. 13 is a longitudinal sectional view showing an electromagnetic valve driving device according to a seventh embodiment.

FIG. 13 is a longitudinal sectional view showing the electromagnetic valve driving device according to the seventh embodiment. In FIG. 13, a concavity 20b-1 is formed at the center of the top surface of the stator iron core 20b according to the sixth embodiment, and stator iron cores 1a, 1b of the displacement sensor are inserted into the concavity 20b-1. This compactly arranges the electromagnetic valve driving device.

Eight Embodiment

Figure 14:
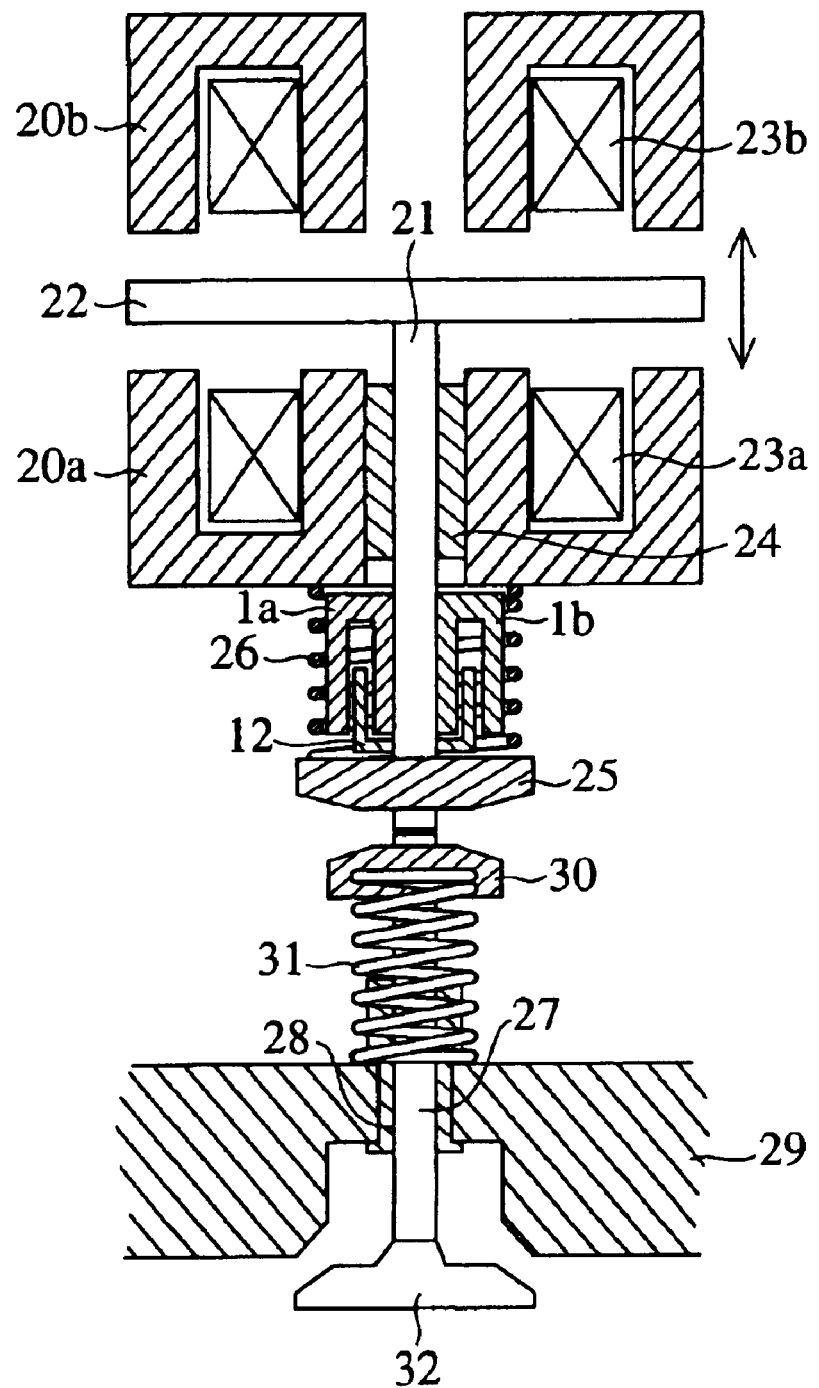
FIG. 14 is a longitudinal sectional view showing an electromagnetic valve driving device according to an eight embodiment.

FIG. 14 is a longitudinal sectional view showing the electromagnetic valve driving device according to the eight embodiment. In FIG. 14, stator iron cores 1a, 1b of the displacement sensor are secured, with the movable iron-core connecting shaft 21 inserted into the bottom surface of the stator iron core 20a according to the sixth embodiment, and the coil spring 26 placed around these stator iron cores 1a, 1b is fitted between the bottom surface of the stator iron core 20a and the spring bearing 25 provided on the movable iron-core connecting shaft 21. This compactly arranges the electromagnetic valve driving device. In passing, the longitudinal sectional views of each iron core shown in FIGS. 6–14 show longitudinal end views.

Ninth Embodiment

Figure 15:
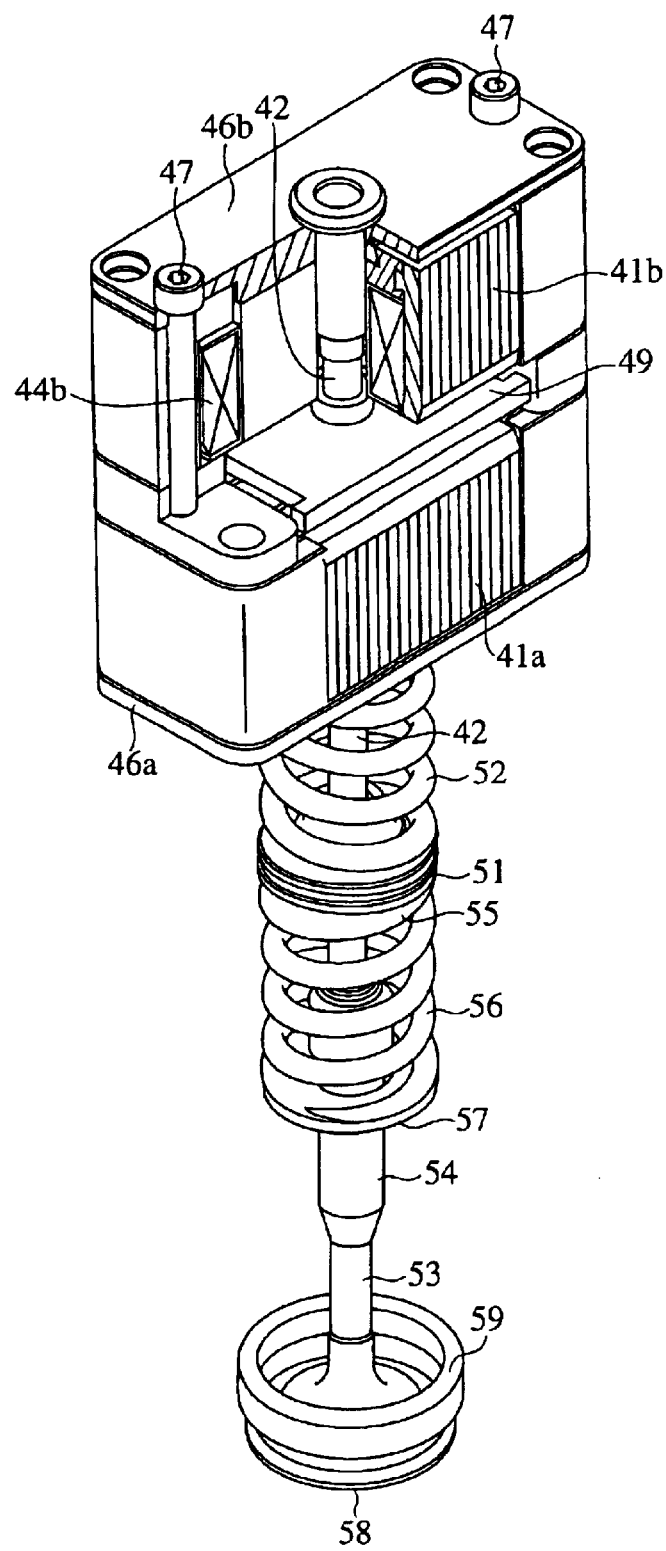
FIG. 15 is a partially broken perspective view showing an electromagnetic valve driving device according to a ninth embodiment.
Figure 16:
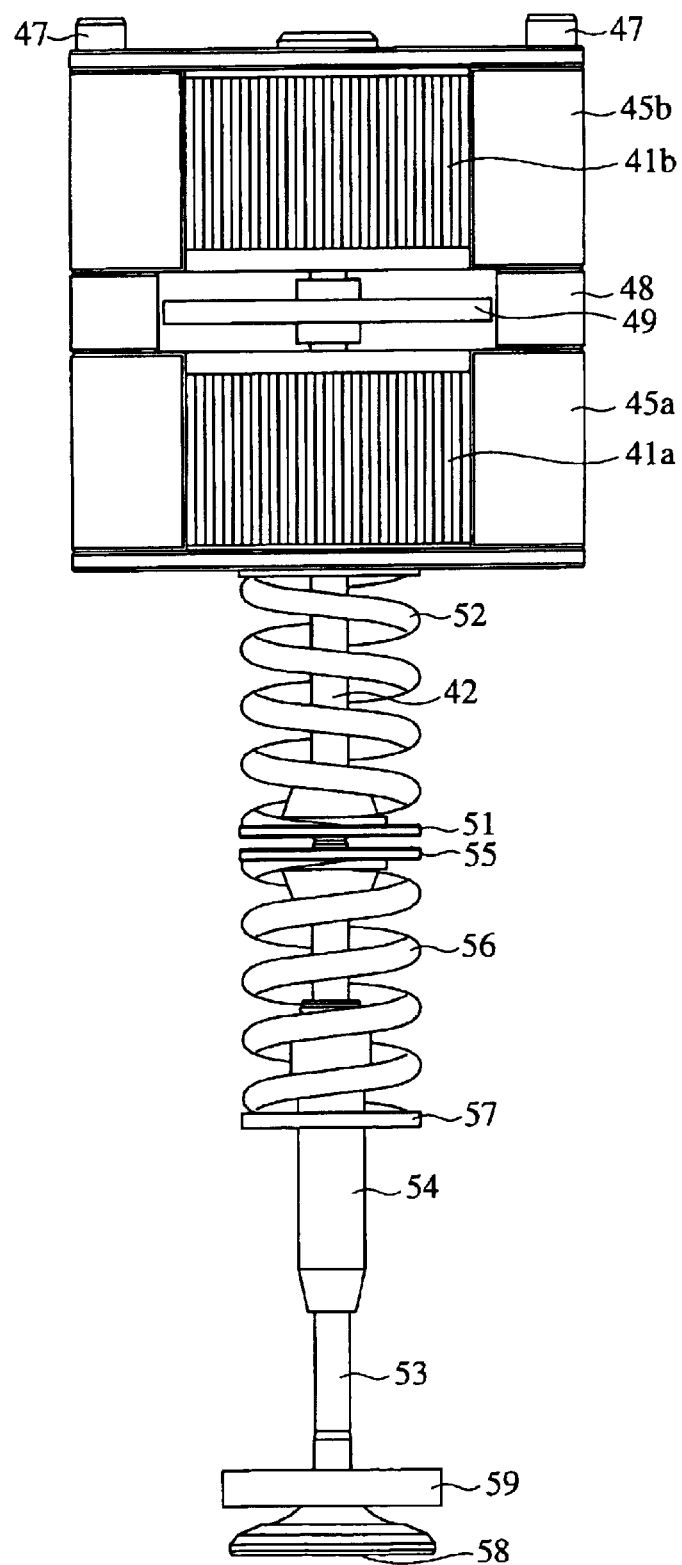
FIG. 16 is a front view of the electromagnetic valve driving device shown in FIG. 15.
Figure 17:
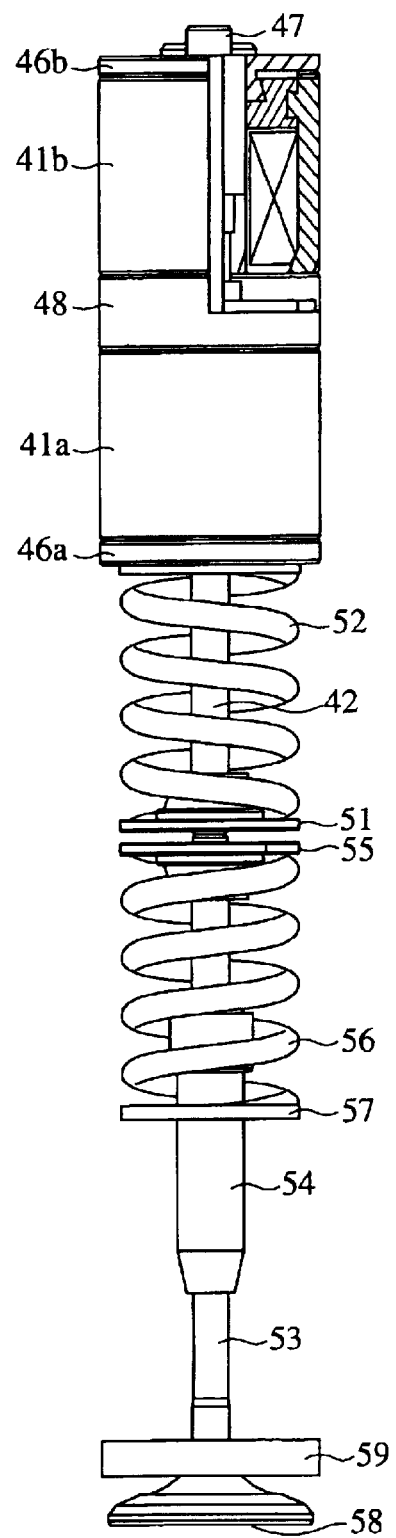
FIG. 17 is a side view of the electromagnetic valve driving device shown in FIG. 15.
Figure 18:
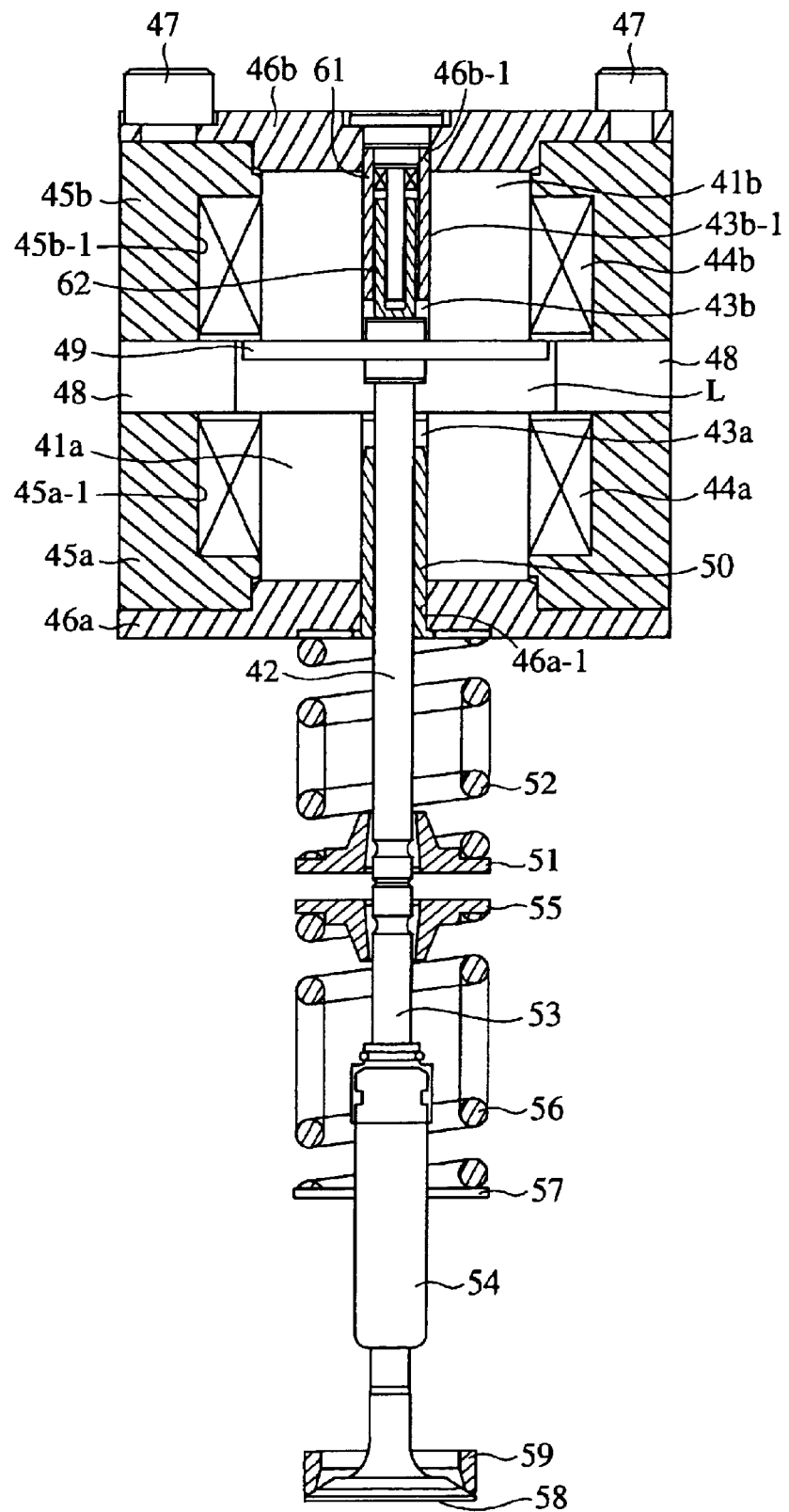
FIG. 18 is a longitudinal sectional front view of the electromagnetic valve driving device shown in FIG. 15.

FIG. 15 is a partially broken perspective view showing the electromagnetic valve driving device according to the ninth embodiment. FIG. 16 is a front view thereof, FIG. 17 is a side view thereof, and FIG. 18 is a longitudinal sectional front view thereof.

Referring to FIGS. 15–18, reference numerals 41a, 41b denote stacked iron cores having at the center through holes 43a, 43b, respectively, through which the movable iron-core connecting shaft 42 is piercing, 44a, 44b denote a first and second coils wound around the stacked iron cores 41a, 41b, respectively, 45a, 45b denote external iron cores having at the internal surface concavities 45a-1, 45b-1, respectively, in which the first and second coils 44a, 44b are disposed, 46a, 46b denote an under iron core and an upper iron core, respectively, that are used as assembly and positioning of the external iron cores 45a, 45b, and 47a, 47b denote assembly bolts that integrally assemble stacked iron cores 41a, 41b, external iron cores 45a, 45b, and under and upper iron cores 46a, 46b intervening spacer 48.

Reference numeral 49 denotes a moving element positioned within the space L between the stacked iron cores 41a, 41b, formed by the spacer 48, and secured on the movable iron-core connecting shaft 42, 50 denotes a bearing of the movable iron-core connecting shaft 42, provided within the through hole 46a-1 of the under iron core 46a, 51 denotes a spring bearing provided on the bottom end of the movable iron-core connecting shaft 42, 52 denotes a first coil spring fitted around the movable iron-core connecting shaft 42 and held between the bottom surface of the under iron core 46a and the spring bearing 51, 53 denotes a valve shaft held movably in a vertical direction by the device body (not shown) through the bearing 54 such that the top end thereof abuts against the bottom end of the movable iron-core connecting shaft 42, 55, 57 denote spring bearings provided on the top and bottoms of the valve shaft 53, respectively, 56 denotes a second coil spring fitted around the movable iron-core connecting shaft 42 and held between the spring bearings 55, 57; 58 denotes a valve disposed on the bottom end of the valve shaft 53, and 59 denotes a valve seat. The electromagnetic valve driving device is composed of the above-described elements.

Reference numeral 61 denotes an elongated longitudinal E-shaped stator iron core that is a constituent element of the displacement sensor, inserted into the through hole 43b-1 of the stacked iron core 41b from the central through hole 46b-1 of the upper iron core 46b, which is secured on the upper iron core 46b. Reference numeral 62 denotes an elongated longitudinal horseshoe-shaped movable iron core that is a constituent element of the displacement sensor, which is secured on the top end of the movable iron-core connecting shaft 42, and the both sides of which are combined so as to juxtapose with the E-shaped stator iron core 61.

The operation of the displacement sensor of the ninth embodiment will next be described below.

When the first coil 44a and the second coil 44b are not energized, the movable iron core 49 is located at a predetermined position within the space L by the aide of balance of the spring forces of the first coil spring 52 and the second coil spring 56.

In this state, when energizing the first coil 44a to open the valve, the movable iron core 49 is attracted and moved to the stacked iron core 41a side by the generated electromagnetic force and the spring force of the first coil spring 52, and thereby the movable iron-core connecting shaft 42 and the valve shaft 53 move downward against the second coil spring 56 to open the valve 58. At this time, to what extent the valve 58 opens is determined depending on how much an energizing current is supplied to the first coil 44a.

Subsequently, in order to close the valve 58, when energizing the second coil 44b after the first coil 44a is deenergized, the movable iron core 49 moves to the stacked iron core 41b side by the generated electromagnetic force and the spring force of the first coil spring 56, and thereby the movable iron-core connecting shaft 42 and the valve shaft 53 move upward against the first coil spring 52 to close the valve 58.

As mentioned above, according to the ninth embodiment, in an opening and closing operation of the valve 58, the position of the horseshoe-shaped movable stator iron core 62 is changed relative to the E-shaped stator iron core 61 of the displacement sensor. Therefore, the movement position of the valve shaft that moves following the movement of the movable iron-core connecting shaft 21 can be detected on the basis of the change of inductance in the magnetic circuit.

Moreover, the robustness of the displacement sensor according to the present invention makes it possible to easy fitting of the sensor in the electromagnetic valve driving device that operates at a high speed. Additionally, the provision of the displacement sensor within the stator iron core compactly arranges the electromagnetic valve driving device with a good appearance.

INDUSTRIAL APPLICABILITY

As mentioned above, the displacement sensor according to the present invention is able to detect the movement position of the moving body with high precision, and the electromagnetic valve driving device including the displacement sensor is suitable for controlling the valve driving position smoothly and accurately.

What is claimed is:

1. A displacement sensor comprising:
   a shaft having an axis and moving axially;
   a first ferromagnetic member secured to the shaft and forming a movable magnetic path;
   a second ferromagnetic member forming a fixed magnetic path and having a side surface opposite the first ferromagnetic member;
   a coil located on an internal surface of the second ferromagnetic member, opposite the first ferromagnetic member, and generating a magnetic field in response to an alternating current fed to the coil; and
   a low resistance magnetic shielding member movable across magnetic flux generated by the coil so that volume of magnetic shielding provided by the low resistance magnetic shielding member varies with displacement of the low resistance magnetic shielding member relative to the second ferromagnetic member.

2. The displacement sensor according to claim 1, wherein the low resistance magnetic shielding member includes a first low-resistance magnetic-shielding member located on an end face of the movable-side magnetic path forming member.

3. The displacement sensor according to claim 2, wherein the low resistance magnetic shielding member includes a second low resistance magnetic-shielding member located on an end face of the second ferromagnetic member.

4. An electromagnetic valve driving device including the displacement sensor of claim 2, wherein the first ferromagnetic member of the displacement sensor is located within the second ferromagnetic member.

5. An electromagnetic valve driving device including the displacement sensor of claim 3, wherein the first ferromagnetic member of the displacement sensor is located within the second ferromagnetic member.

6. The displacement sensor according to claim 1, wherein the low-resistance magnetic-shielding member is located on an end face of the first ferromagnetic member.

7. The displacement sensor according to claim 2, wherein the first low-resistance magnetic-shielding member has an end face in contact with the end face of the first ferromagnetic member and at least parts of the end faces of the first ferromagnetic member and the first low resistance magnetic shielding member are oblique to the axis.

8. An electromagnetic valve driving device including the displacement sensor of claim 6, wherein the first ferromagnetic member of the displacement sensor is located within the second ferromagnetic member.

9. An electromagnetic valve driving device including the displacement sensor of claim 6, wherein the first ferromagnetic member of the displacement sensor is located within the second ferromagnetic member.

10. An electromagnetic valve driving device including the displacement sensor of claim 7, wherein the first ferromagnetic member of the displacement sensor is located within the second ferromagnetic member.

* * * * *

UNITED STATES PATENT AND TRADEMARK OFFICE
CERTIFICATE OF CORRECTION

PATENT NO.      : 6,916,005 B2                                              Page 1 of 1
DATED           : July 12, 2005
INVENTOR(S)     : Seo et al.

It is certified that error appears in the above-identified patent and that said Letters Patent is hereby corrected as shown below:

Title page,
Item [54], Title, change to -- DISPLACEMENT SENSOR AND ELECTROMAGNETIC VALVE DRIVING DEVICE --.

Column 10,
Line 56, change "6," to -- 1, --.

Signed and Sealed this

Twenty-second Day of November, 2005

JON W. DUDAS
*Director of the United States Patent and Trademark Office*